Feb. 17, 1970  T. O. SLETHEI  3,496,285
SELF-DAMPING ELECTRICAL LINE
Filed Jan. 26, 1968  2 Sheets-Sheet 1

Inventor
TORE O. SLETHEI
By Edward Goldberg
Attorney

United States Patent Office 3,496,285
Patented Feb. 17, 1970

3,496,285
SELF-DAMPING ELECTRICAL LINE
Tore Olav Slethei, Trondheim, Norway, assignor to Elektrisitetsforsyningens Forskningsinstitutt, Trondheim, Norway
Filed Jan. 26, 1968, Ser. No. 700,959
Claims priority, application Norway, Jan. 27, 1967, 111/68
Int. Cl. H01b 5/10; H02g 7/14
U.S. Cl. 174—130
4 Claims

ABSTRACT OF THE DISCLOSURE

Wire conductors in the core of an electrical line are disposed in a substantially parallel position with respect to the longitudinal axis in order to provide maximum friction and mechanical damping to reduce the effects of transverse oscillations and vibration. Pressure is applied to the core by particular outer layers of wires, clamps, or insulation.

BACKGROUND OF THE INVENTION

Field of the invention

The present invention concerns electrical lines or parts of lines made of metal or combinations of metals and alloys, and particularly overhead electrical conductors requiring large mechanical damping to control transverse oscillations.

The invention relates further to lines suspended in free air or in a fluid, which under certain circumstances are subjected to tranverse oscillations or vibrations which can prove detrimental, such as by causing metal fatigue of the lines or of other parts of the design.

Description of the prior art

Overhead electrical lines are subjected to several different types of transverse oscillations and vibrations of which three main forms are considered below:

(1) Aeolic oscillations, which are due to periodic turbulence relief and occur at low and moderate wind intensity;
(2) Galloping oscillations, which are due to aerodynamic instability and occur at moderate and high wind intensity; and
(3) Corona vibrations which are due to high electrical intensity on the conductor surface and occur mostly in damp atmosphere.

The most common method to reduce the effects of aeolic vibrtions on electrical overhead lines is to install vibration dampers and/or strengthening devices.

There are also known methods to manufacture lines which are vibration-free in themselves, but these have very limited use.

One known design avoids the occurrence of resonance oscillations by utilizing a hollow conductor with a free mobile core, suspended in such a way that the exterior hollow conductor and the inner core will have deviating resonance frequencies.

Another design, shown in U.S. Patent No. 3,204,021, reduces resonance oscillations by manufacturing the line with a varying diameter and/or varying weight per unit of length, or increases the self-damping of the line by introducing a non-metallic substance with a large mechanical hysteresis. The general principle of increasing self damping by using an elastic non-metallic material with large damping was also known prior to the above patent.

The mechanical damping in a multi-wire line is mainly due to air-friction, inner damping of the wire material itself, and friction force due to the relative motion between the individual wires and layers. Of these contributions to the damping, the friction force due to relative motion between the individual wires and layers is considered to be the most important. The present invention aims to increase this friction force in relation to what is achieved in existing line-designs.

SUMMARY OF THE INVENTION

The primary object of the present invention is to minimize vibrations and oscillations of overhead electrical lines by increasing friction between the wires to provide self-damping.

The main feature of the present invention is that the core of the line comprises at least two wires parallel to the axis of the line or has a very long length of lay and that outer continuous or discontinuous layers provide a pressure between the individual wires and/or layers so that the friction force generated in the line during mechanical oscillations is as great as possible under the actual working conditions of the line to provide self-damping.

A practical accomplishment of the invention is a line-design where the inner pressure between the wires and the layers is independent of the tension, such as a line where all the wires are parallel with the axis of the line. Tests have indicated that the self-damping for such a line is considerably greater than for a similar line of normal design.

In view of the design and in order to control the pressure between the individual wires and layers to provide the greatest possible self-damping at a particular tension and other performing conditions, it may be desirable to give the wires a certain length of lay, but this will have to be very long compared to what is common for electrical overhead lines of today.

In case the wires are kept parallel, they must be held together by an outer layer which controls the pressure between wires and layers. The outer layer may consist of one or more layers of stranded metal wires in the form of a metal tube or some other material, or it may be in the form of tape or clamps, which confine the line's circular shape at discrete lengths. In connection with this principle it might be considered to increase the self-damping by introducing a non-metallic energy absorbing substance with a high mechanical hysteresis, such as neoprene, within the spaces between the wire core and/or outer layers. While this general principle is known, in this case an added effect is gained because the material yields to the relative motion between the wires and layers.

The above mentioned and other objects and features will become apparent from the following detailed description taken in conjunction with the drawings which indicate several embodiments of the invention.

DESCRIPTION OF THE PREFERRED EMBODIMENTS

Figure 1:
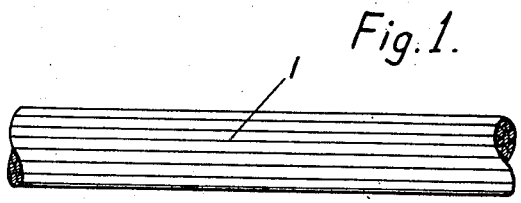
FIG. 1 shows a line with a core of parallel wires or wires having a long length of lay.

As shown in FIG. 1, when a stranded multi-wire line is subjected to tension, the individual wires and layers will be pressed against each other with a pressure which depends on the tension and the design of the line. Friction between the individual wires and layers counteracts relative motion, with the force being dependent on the pressure.

When a line which is subjected to tension is also subjected to bending at the same time, internal forces will arise in the line which will cause an elastic deformation. If these internal forces due to bending are capable of resisting the friction forces between the individual wires and layers at one or more sections, a relative motion will take place between the individual wires and layers at those points. This motion will result in friction which contributes to the damping of the line as stated above.

In order that friction from relative motion between the individual wires and layers be present, even for small amounts of bending, the pressure between wires and layers must not be too great. When the motion first starts, the pressure should be as great as possible without reducing relative motion, in order to achieve the greatest possible friction force.

This leads to the conclusion that an optimum pressure or pressure-distribution exists between the individual wires and layers that have the greatest friction at a particular bending level.

The method of stranding the wires largely determines the relation between the axial tension and the inner pressure. In lines stranded in the ordinary way, the inner pressure will increase when the tension is increased and this will cause a more or less gradual locking of the individual wires and layers. This occurs through a decrease of the self-damping, which by increasing tension approaches a value representative of a homogeneous rod of the same material with corresponding outer dimensions. Due to the decrease of self-damping at increasing tension, the risk of oscillation limits the suspension tension which can be employed without taking any precautions.

Figure 2:
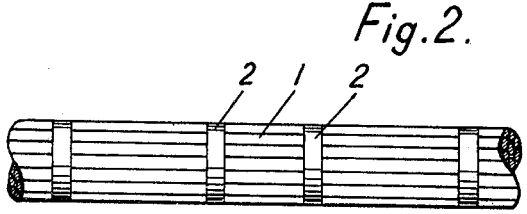
FIG. 2 shows a similar line with a core confined by tape or clamps.

As shown in FIG. 2, pressure is applied to the plurality of parallel wires of core 1 by tape or clamps 2 which retain the inner wires. The wires may also be wound with a particular length of lay which is relatively long compared to normally wound cables, and the clamps may be distributed with uneven spacing.

Figure 3:
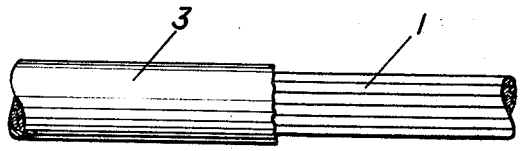
FIG. 3 shows a line where the core is enclosed in an outer hollow layer.

FIG. 3 shows another arrangement enclosing the core in a hollow shaped or tubular metallic or non-metallic outer layer 3 which may be extruded onto the core.

Figure 4:
FIG. 4 shows a line where the core is surrounded by a layer of round wires with a long length of lay.
Figure 5:
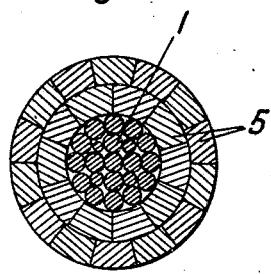
FIGS. 5, 6 and 7 show lines where the core is surrounded by two layers of profiled wires, one profiled layer and one layer of round wires, and two layers of round wires, respectively.
Figure 6:
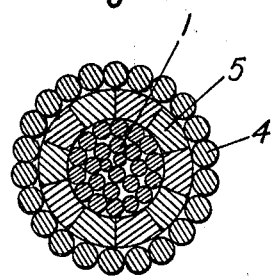
Figure 7:
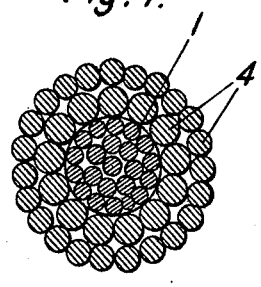

The outer pressure applying layer may also be formed of round wires 4 having a long length of lay as shown in FIG. 4, or profiled wires 5 of FIG. 5. Two such layers may be used or various combinations of round and profiled wires 4, 5 respectively, as shown in FIGS. 5, 6 and 7. An example of a preferred design is a line where one or more of the wire layers have a length of lay such that the angle between the projection of the various wires and the line axis does not exceed 0.045 radian.

The present invention thus provides a line that is vibration-free at higher suspension tension than that normally employed for non-damped overhead electrical lines. Another advantage of this invention is that mounting vibration dampers on the overhead electrical line is obviated. It is therefore no longer necessary to inspect and control the dampers, and the danger of damage to the dampers can be eliminated.

What is claimed is:

1. An electrical line comprising a conductive core and a conductive outer layer of wires surrounding said core, said core having a plurality of contacting wires substantially parallel to the axis of the line, said outer layer positioned directly on said core and having a relatively long length of lay such that the angle between the projection of the outer wires and the line axis does not exceed 0.045 radian, said outer layer applying pressure to said core wires so that a large friction force is generated in the line under mechanical oscillations to provide self-damping.

2. An electrical line according to claim 1 including two outer layers of wires having a relatively long length of lay.

3. An electrical line according to claim 2 wherein one of the outer layers comprises profiled wires having flat sides.

4. An electrical line according to claim 3 wherein both outer layers are profiled wires having flat sides.

References Cited

UNITED STATES PATENTS

| 379,535 | 3/1888 | Hewitt | 57—145 X |
| 1,312,872 | 8/1919 | Rettinger | 57—145 |
| 1,537,698 | 5/1925 | Robinson | 174—128 X |
| 2,945,457 | 7/1960 | Avery et al. | 174—113 X |
| 3,128,214 | 4/1964 | Lay. | |
| 3,236,939 | 2/1966 | Blewis et al. | 174—116 X |

FOREIGN PATENTS

| 1,323,006 | 2/1963 | France. |
| 303,666 | 1/1929 | Great Britain. |
| 835,348 | 5/1960 | Great Britain. |

LARAMIE E. ASKIN, Primary Examiner

U.S Cl. X.R.

174—42